US010130890B2

(12) United States Patent
Oshima et al.

(10) Patent No.: US 10,130,890 B2
(45) Date of Patent: Nov. 20, 2018

(54) GAME DEVICE

(75) Inventors: Takenori Oshima, Tokyo (JP); Masahiro Fujihara, Tokyo (JP); Keigo Tamura, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 369 days.

(21) Appl. No.: 13/813,518

(22) PCT Filed: Aug. 1, 2011

(86) PCT No.: PCT/JP2011/067622
§ 371 (c)(1),
(2), (4) Date: Jan. 31, 2013

(87) PCT Pub. No.: WO2012/017995
PCT Pub. Date: Feb. 9, 2012

(65) Prior Publication Data
US 2013/0130794 A1    May 23, 2013

(30) Foreign Application Priority Data

Aug. 5, 2010 (JP) ................. 2010-176771
Aug. 5, 2010 (JP) ................. 2010-176772
Aug. 5, 2010 (JP) ................. 2010-176773

(51) Int. Cl.
*A63F 13/86* (2014.01)
*A63F 13/87* (2014.01)
*A63F 13/30* (2014.01)

(52) U.S. Cl.
CPC .............. *A63F 13/86* (2014.09); *A63F 13/12* (2013.01); *A63F 13/87* (2014.09); *A63F 2300/53* (2013.01); *A63F 2300/534* (2013.01)

(58) Field of Classification Search
CPC ..................................... A63F 13/86
(Continued)

(56) References Cited

U.S. PATENT DOCUMENTS 7,632,186 B2 * 12/2009 Spanton et al. ................. 463/40
2002/0160838 A1   10/2002 Kim
(Continued)

FOREIGN PATENT DOCUMENTS

CN    1383078       12/2002
CN    1577372 A     2/2005
(Continued)

OTHER PUBLICATIONS

Translation of JP 2002248273 Aoki et al., Video game device and its control method, program of video game and computer readable storage medium for recording this program, 11 pages.*
(Continued)

*Primary Examiner* — Jay Liddle
*Assistant Examiner* — Alex F. R. P. Rada, II
(74) *Attorney, Agent, or Firm* — Katten Muchin Rosenman LLP

(57) ABSTRACT

Provided is a user interface having improved usability when, in a period in which information relating to a state of a game which is being executed by a game device is being distributed to another game device, users exchange messages regarding the game being distributed. The game device executes a game application, distributes the information relating to the state of the game being executed to the another game device, receives from a distribution-destination game device a message input by the user of the distribution-destination game device regarding the distributed information, and controls display means to display a game image representing the state of the game along with the received message.

9 Claims, 6 Drawing Sheets

(58) Field of Classification Search
USPC .......................................... 463/1, 29, 40–43
See application file for complete search history.

(56) References Cited

U.S. PATENT DOCUMENTS

| | | | | |
|---|---|---|---|---|
| 2002/0183114 | A1* | 12/2002 | Takahashi et al. ............. | 463/42 |
| 2002/0183115 | A1* | 12/2002 | Takahashi ............... | A63F 13/12 |
| | | | | 463/42 |
| 2002/0183116 | A1* | 12/2002 | Takahashi et al. ............. | 463/42 |
| 2002/0183117 | A1* | 12/2002 | Takahashi et al. ............. | 463/42 |
| 2002/0198045 | A1 | 12/2002 | Okubo | |
| 2003/0003977 | A1* | 1/2003 | Takahashi et al. ............. | 463/3 |
| 2003/0074665 | A1* | 4/2003 | Varley ............................ | 725/78 |
| 2004/0224772 | A1 | 11/2004 | Canessa et al. | |
| 2006/0058103 | A1* | 3/2006 | Danieli et al. .................. | 463/42 |
| 2007/0117617 | A1* | 5/2007 | Spanton et al. ................ | 463/29 |
| 2007/0117635 | A1* | 5/2007 | Spanton et al. ................ | 463/43 |
| 2007/0294089 | A1* | 12/2007 | Garbow ................. | A63F 13/12 |
| | | | | 705/26.1 |
| 2008/0096663 | A1* | 4/2008 | Lieberman .............. | A63F 13/10 |
| | | | | 463/42 |
| 2008/0125226 | A1* | 5/2008 | Emmerson ..................... | 463/42 |

FOREIGN PATENT DOCUMENTS

| | | | | |
|---|---|---|---|---|
| CN | 1714900 | A | | 1/2006 |
| CN | 1963829 | A | | 5/2007 |
| CN | 101106560 | A | | 1/2008 |
| CN | 101336441 | A | | 12/2008 |
| EP | 1 262 217 | | | 12/2002 |
| JP | 2002248273 | A | | 9/2002 |
| JP | 2002248273 | A | * 9/2002 | ............. A63F 13/12 |
| JP | 2003-30105 | | | 1/2003 |
| JP | 200324643 | A | | 1/2003 |
| JP | 2003000951 | A | | 1/2003 |
| JP | 2004223084 | A | | 8/2004 |
| JP | 2004329914 | A | | 11/2004 |
| JP | 2005296419 | A | | 10/2005 |
| JP | 2006-149671 | | | 6/2006 |
| JP | 2007222563 | A | | 9/2007 |
| JP | 2009-022365 | | | 2/2009 |

OTHER PUBLICATIONS

International Search Report dated Nov. 1, 2011 from the corresponding PCT/JP2011/067622.
Supplementary European Search Report dated Dec. 10, 2013, from corresponding European Application No. 11814620.8.
International Preliminary Report on Patentability and Written Opinion of the International Searching Authority dated Mar. 21, 2013, from corresponding International Application No. PCT/JP2011/067622.
Chinese Notification of First Office Action dated Apr. 24, 2014 from corresponding application No. 201180038417.1.
Japanese Notification of Reasons for Refusal dated Sep. 2, 2014 from corresponding Application No. 2010-176773.
Japanese Notification of Reasons for Refusal dated Feb. 16, 2016 from corresponding Application No. 2010-176771.
Japanese Notification of Reason for Refusal dated Feb. 16, 2016 from corresponding Application No. 2010-176772.
Japanese Notification of Reason for Refusal dated Feb. 16, 2016 from corresponding Application No. 2010-176773.
Japanese Notification of Reason for Refusal dated Jun. 9, 2015 from corresponding Application No. 2010-176771.
Chinese Notification of First Office Action dated Jan. 10, 2017, from corresponding Chinese Application No. 201410839989.5.

* cited by examiner

| DISTRIBUTION SOURCE DEVICE | USER IDENTIFICATION INFORMATION | GAME IDENTIFICATION INFORMATION | MAKER IDENTIFICATION INFORMATION |
|---|---|---|---|
| GAME DEVICE 10a | USER U1 | GAME G1 | MAKER M1 |
| GAME DEVICE 10b | USER U2 | GAME G2 | MAKER M2 |
| ⋮ | ⋮ | ⋮ | ⋮ |

GAME DEVICE

TECHNICAL FIELD

The present invention relates to a game device, a control method therefor, a distribution management server, and an information storage medium.

BACKGROUND ART

A game device connected to another game device via a communication network, and has a function (such as a chat function) of exchanging messages with the game device is known. Moreover, there is a game device which distributes information indicating a state of a game currently played by a user (such as a motion image representing the state of play of the game) to another game device. Moreover, a distribution device for distributing a motion image representing a content of play of a game previously played by a user is also known. When a game device receives and displays a motion image distributed by another game device or a distribution device in this way, a user of the game device can browse a content of play of a game by another user. Moreover, there is a game device for enabling participation in a game executed on another game device by transmitting an operation content of a game via a communication network to the game device.

SUMMARY OF INVENTION

Technical Problem

It is an object of the present invention to provide a game device capable of providing a user interface increased in convenience when, while a game device is distributing information on a state of a game being executed to another game device, users exchange messages relating to the game being distributed with one another, a control method for the game device, and an information recording medium.

It is another object of the present invention to provide a game device capable of efficiently selecting, when a plurality of motion images representing contents of play of games are distributed, a motion image to be presented to a user out of the plurality of motion images, a control method for the game device, a distribution management server, and an information storage medium.

It is still another object of the present invention to provide a game device for promoting a participation in a game represented by a motion image representing a content of play of the game on another game device when a user intend to participate in the game in a state in which the motion image is received and displayed, a control method therefor, and an information storage medium.

Solution to Problem

A game device according to the present invention is characterized by including: game execution means for executing a game application; distribution means for distributing information on a state of a game being executed by the game execution means to another game device; message reception means for receiving a message, which is input by a user of the another game device regarding the distributed information, from the another game device; and display control means for controlling display means to display a game image representing the state of the game along with the received message.

Moreover, in the game device, the game execution means may generate a game image for play to be browsed by a user of the game device for playing the game, and the display control means may control the display means to display, as the game image, the game image for play along with the received message.

Moreover, in the game device, the game execution means may generate a game image for play to be browsed by the user of the game device for playing the game, and generate a game image for distribution different from the game image for play, and used for the distribution by the distribution means, the distribution means may distribute, as the information on the state of the game being executed, the game image for distribution to the another game device, and the display control means may control the display means to display, as the game image, the game image for distribution along with the received message.

Further, the game device may further include message transmission means for transmitting a message, which is input by the user of the game device regarding the distributed information, to the another game device, and the display control means may control the display means to display the game image representing the state of the game along with both the received message and the transmitted message.

Moreover, in the game device, the distribution means may distribute the information on the state of the game to a plurality of other game devices, and the display control means may control the display means to display a number of game devices receiving the information distributed by the distribution means.

Moreover, a method of controlling a game device according to the present invention is characterized by including: a game execution step of executing a game application; a distribution step of distributing information on a state of a game being executed in the game execution step to another game device; a message reception step of receiving a message input by a user of the another game device regarding the distributed information from the another game device; and a display control step of controlling display means to display a game image representing the state of the game along with the received message.

Moreover, a computer readable information storage medium according to the present invention has stored thereon a program for controlling a computer to function as: game execution means for executing a game application; distribution means for distributing information on a state of a game being executed by the game execution means to another game device; message reception means for receiving a message input by a user of the another game device regarding the distributed information from the another game device; and display control means for controlling display means to display a game image representing the state of the game along with the received message.

Moreover, another game device according to the present invention is a game device, which controls display means to display a motion image representing a content of play of a game by another user, characterized by including: selection condition acquisition means for acquiring selection condition information for selecting a motion image subject to display; selection means for selecting, out of a plurality of candidate motion images each representing the content of play of the game by another user and being associated with attribute information, a motion image to which attribute information corresponding to the selection condition information is associated, as the motion image subject to display; and display control means for receiving the selected motion image from a distribution source device, and controlling the display means to display the selected motion image.

The game device may further include message reception means for receiving a message including information for identifying a transmitting user, and the selection condition acquisition means may acquire the information for identifying the transmitting user included in the received message, as the selection condition information.

Moreover, the game device may further include game execution means for executing a game application, and the selection condition acquisition means may acquire information relating to the game application executed by the game execution means, as the selection condition information.

Further, the selection condition acquisition means may acquire information for identifying a game application executed by the game execution means, as the selection condition information.

Moreover, the selection condition information acquisition means may acquire information for identifying a maker of the game application executed by the game execution means, as the selection condition information.

Moreover, the display control means may display the selected motion image for a period in which the game execution means is carrying out predetermined processing.

Further, in the game device, the predetermined processing may be processing of reading out data stored in an information storage medium.

Moreover, in the game device, the selection condition information acquisition means may further acquire information indicating a degree of progress of the game executed by the game execution means, as the selection condition information, and the selection means may select, as the motion image subject to display, a motion image of a game which is represented by the acquired information for identifying the game application, and which represents a content of play at a degree of progress determined depending on the acquired degree of progress.

Moreover, a distribution management server according to the present invention is characterized by including: means for storing information on a plurality of candidate motion images each representing a content of play of a game and being associated with attribute information; means for receiving a selection request, which includes selection condition information used for selecting a motion image subject to display, from a game device; and selection means for selecting a motion image, to which attribute information corresponding to a selection condition included in the received selection request is associated, as the motion image subject to display by the game device out of the plurality of candidate motion images.

Moreover, another method of controlling a game device according to the present invention is a method of controlling a game device, which controls display means to display a motion image representing a content of play of a game by another user, characterized by including: a selection condition acquisition step of acquiring selection condition information for selecting a motion image subject to display; a selection step of selecting, out of a plurality of candidate motion images each representing the content of play of the game by another user and being associated with attribute information, one of motion images to which attribute information corresponding to the selection condition information is associated, as the motion image subject to display; and a display control step of receiving the selected motion image from a distribution source device, and controlling the display means to display the selected motion image.

Moreover, another information storage medium according to the present invention is a computer readable information storage medium having stored thereon a program for controlling a game device, which controls display means to display a motion image representing a content of play of a game by another user, the program controlling a computer to function as: selection condition acquisition means for acquiring selection condition information for selecting a motion image subject to display; selection means for selecting, out of a plurality of candidate motion images each representing the content of play of the game by another user and being associated with attribute information, one of motion images to which attribute information corresponding to the selection condition information is associated, as the motion image subject to display; and display control means for receiving the selected motion image from a distribution source device, and controlling the display means to display the selected motion image.

Still another game device according to the present invention is characterized by including: display control means for receiving, from another game device, distribution of a motion image representing a state of play of a game being executed on the another game device, and controlling display means to display the motion image; operation reception means for receiving a predetermined operation input from a user in a state in which the motion image is displayed; and participation request means for transmitting a participation request for the game that is being executed on the another game device in response to the reception of the predetermined operation input.

Moreover, in the game device, the display control means may provide control of displaying an operation subject image subject to a participation operation along with the motion image, and the operation reception means may receive an operation by the user on the operation subject image as the predetermined operation input.

Moreover, the game device may further include game execution means for executing a game application, and when the game subject to the participation request has not previously been executed by the game execution means, participation in the game in response to the participation request may be restricted based on a predetermined condition.

Moreover, the game device may further include: game execution means for executing a game application; play-result-related information reception means for receiving, from the another game device, play-result-related information relating to a play result of the game in which the user has participated in response to the participation request; and play-result-related information storage means for storing the received play-result-related information in association with the user along with information output as a result of execution, by the game execution means, of an application of the same game as the game in which the user has participated in.

Moreover, still another method of controlling a game device according to the present invention is characterized by including: a display control step of receiving, from another game device, distribution of a motion image representing a state of play of a game being executed on the another game device, and controlling display means to display the motion image; an operation reception step of receiving a predetermined operation input from a user in a state in which the motion image is displayed; and a participation request step of transmitting, in response to the reception of the predetermined operation input, a participation request for the game that is being executed on the another game device.

Moreover, still another information storage medium according to the present invention is a computer readable information storage medium having stored thereon a program for controlling a computer to function as: display control means for receiving, from another game device, distribution of a motion image representing a state of play of a game being executed on the another game device, and controlling display means to display the motion image; operation reception means for receiving a predetermined operation input from a user in a state in which the motion image is displayed; and participation request means for transmitting, in response to the reception of the predetermined operation input, a participation request for the game that is being executed on the another game device.

DESCRIPTION OF EMBODIMENT

Figure 1:
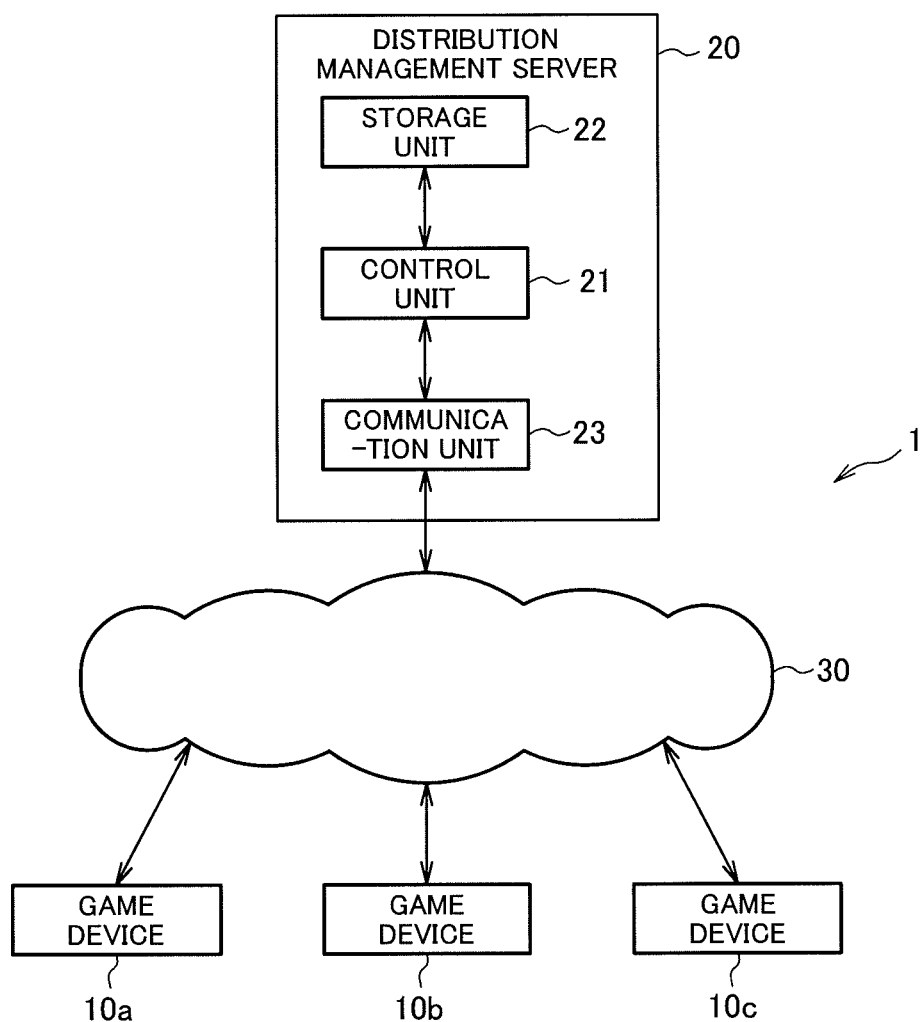
FIG. 1 A schematic view of a game system according to an embodiment of the present invention.

A detailed description is now given of an embodiment of the present invention referring to the drawings.

FIG. 1 is a schematic diagram illustrating an overall configuration of a game distribution system 1 according to the embodiment of the present invention. The game distribution system 1 includes a plurality of game devices 10 and a distribution management server 20. Specifically, according to this embodiment, the game distribution system 1 includes three game devices 10 including game devices 10a, 10b, and 10c. Each of the game devices 10 is communicably connected to other game devices 10 and the distribution management server 20 through a communication network 30. The communication network 30 may include a variety of networks such as the Internet, a local area network, and a wireless communication network.

Figure 2:
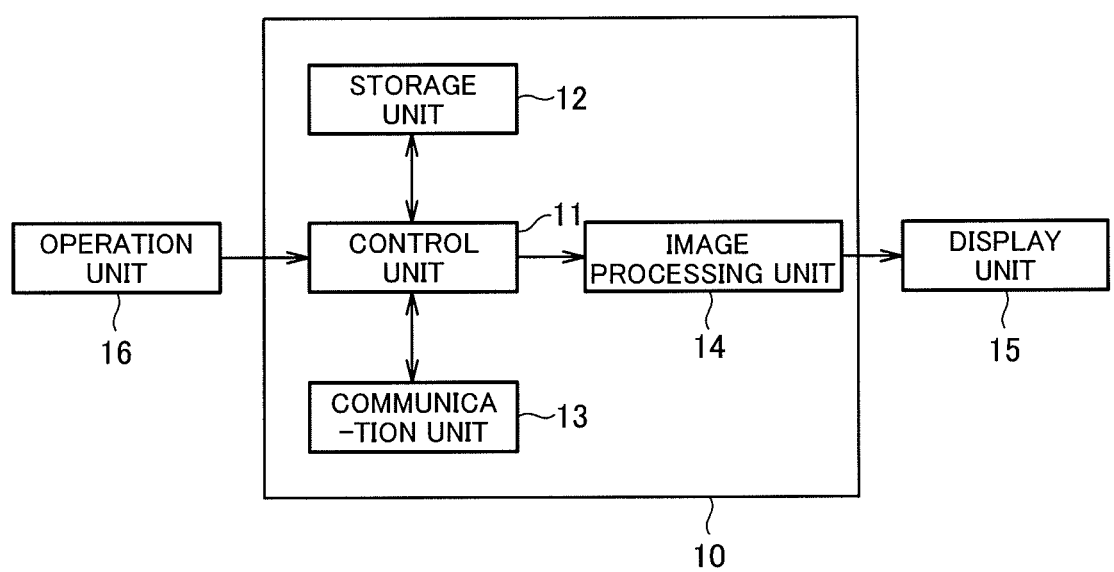
FIG. 2 A configuration diagram of a game device according to the embodiment of the present invention.

The game device 10 is an information processing device used by a user to play a game or to watch a state of a game played by another user, and may be a consumer game machine, a portable game machine, a personal computer, or the like. FIG. 2 is a configuration block diagram illustrating a configuration of the game device 10. As illustrated in FIG. 2, the game device 10 includes a control unit 11, a storage unit 12, a communication unit 13, and an image processing unit 14. Moreover, the game device 10 is connected to a display unit 15 and an operation unit 16.

The control unit 11 includes a program control device such as a CPU and executes various types of information processing in accordance with programs stored in the storage unit 12. The storage unit 12 includes a memory element such as a RAM or a ROM, and stores the programs executed by the control unit 11 and data to be processed by the programs. The storage unit 12 also functions as a work memory for the control unit 11.

The communication unit 13 is an interface for communicating data to/from another device via the communication network 30, and the game device 10 transmits and receives information to and from the other game devices 10 and the distribution management server 20 via the communication unit 13.

The image processing unit 14 includes, for example, a GPU and a frame buffer memory, and renders an image to be displayed on the display unit 15 in accordance with a rendering instruction output by the control unit 11. As a specific example, the GPU writes the image to the frame buffer memory every predetermined time in accordance with the instruction from the control unit 11. Then, the image written to the frame buffer memory is converted into a video signal at a predetermined timing, and displayed on the screen of the display unit 15.

The display unit 15 is a display device such as a home-use television receiver, or a liquid crystal display, and displays an image based on a video signal output by the image processing unit 14. According to this embodiment, the display unit 15 displays an image such as a game image generated by game processing carried out by the game device 10.

The operation unit 16 is a device for receiving operational input from the user and may include a keyboard, a mouse, or a controller for a consumer game machine, for example. Further, the operation unit 16 may include an operation member provided on a front surface of a casing of the game device 10, such as an operation button or a switch. The user makes an operation on the operation unit 16 to input various types of instructions with respect to the game device 10.

The distribution management server 20 is an information processing device such as a server computer. As illustrated in FIG. 1, the distribution management server 20 includes a control unit 21, a storage unit 22, and a communication unit 23.

The control unit 21 includes a program control device such as a CPU and executes various types of information processing in accordance with programs stored in the storage unit 22. The storage unit 22 includes a memory element such as a RAM or a ROM, and stores the programs executed by the control unit 21 and data to be processed by the programs. The storage unit 22 also functions as a work memory for the control unit 21.

The communication unit 23 is an interface for communicating data to/from another apparatus via the communication network 30, and the distribution management server 20 transmits and receives information to and from each of the game device 10 via the communication unit 23.

According to this embodiment, each of the game devices 10 can execute a game application, thereby enabling a user to play a game, and can distribute information on a play state of the game to other game devices 10. Specifically, for example, the game device 10 distributes an image of a game screen being played by the user of the game device 10 as information on the play state of the game to other game devices 10. As a result, a user of the game device 10 which has received the distribution can know the game play state of another user by browsing information on the state of the game being played by the user of the game device carrying out the distribution. For the sake of description, the game device 10 which distributes information on the play state of a game to another game device 10 is hereinafter referred to as distribution source device. Moreover, the game device 10 on the reception side of the distribution is hereinafter referred to as reception-side device.

Moreover, according to this embodiment, the user of the reception-side device can also participate in a game being executed by the distribution source device. In this case, the information on the play state of the game is distributed by the distribution source device and is presented to the user of the reception-side device, and a content of a game operation input on the operation unit 16 by the user is transmitted from the reception-side device to the distribution source device, and is reflected to a progress of the game.

As described in detail later, the distribution management server 20 manages information on a game device 10 which serves as a distribution source device to distribute the game play state to another game device 10, and provides the other game device 10 with information on the game device 10 serving as the distribution source device in response to a request.

Figure 3:
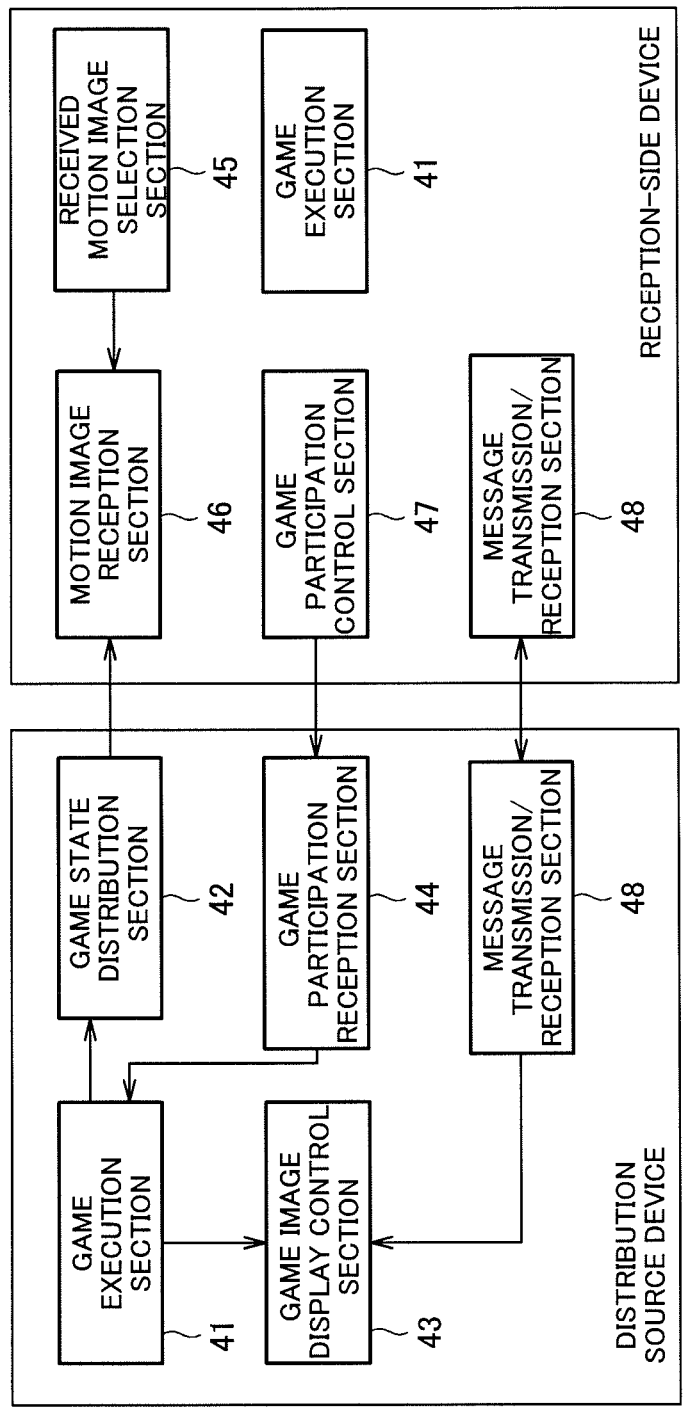
FIG. 3 A functional block diagram illustrating functions realized by the game system according to the embodiment of the present invention.

A description is now given of functions realized by the game device 10 according to this embodiment. FIG. 3 is a functional block diagram illustrating the functions realized respectively by the distribution source device and the reception-side device. As illustrated in FIG. 3, the game device 10 functioning as the distribution source device functionally includes a game execution section 41, a game state distribution section 42, a game image display control section 43, a game participation reception section 44, and a message transmission/reception section 48. Moreover, the game device 10 functioning as the reception-side device functionally includes a game execution section 41, a received motion image selection section 45, a motion image reception section 46, a game participation control section 47, and a message transmission/reception section 48. Note that, a single game device 10 may include the functions both for the distribution source device and the reception-side device. Those functions are realized by the control section 11 executing a program stored in the storage section 12. The programs may be stored and provided in one of various computer-readable information storage media such as an optical disc, or may be provided via a communication network such as the Internet.

The game execution section 41 is realized by the control unit 11 executing a program of a game application stored in the storage unit 12. The game execution section 41 receives an operation content input by the user playing a game on the operation unit 16, carries out game processing based on the content, and controls the display unit 15 to display a game image representing a result of the game processing. In this case, the game image displayed on the display unit 15 is an image representing a state of the game reflecting the game operation by the user, and is an image browsed by the user in order to play the game. The game image browsed by the user during game play is hereinafter referred to as game image for play. The user of the game device 10 can play the game by inputting a game operation while browsing the game image for play.

According to this embodiment, a game image for play generated by the game execution section 41 is not always directly displayed on the display unit 15. In other words, the game image for play generated by the game execution section 41 may be processed by the game image display control section 43 described later, and is displayed on the display unit 15. Moreover, a game image for play may be subject to distribution to another game device 10 by the game state distribution section 42. Further, the game execution section 41 may independently generate a game image for the distribution to another game device (reception-side device) which is different from a game image for play. A game image distributed to a reception-side device and then browsed by a user of the reception-side device is hereinafter referred to as game image for distribution. Note that, the distribution source device may distribute a game image for distribution simultaneously to a plurality of reception-side devices. In this case, the game execution section 41 may generate a plurality of game images for distribution different from one another respectively for the plurality of reception-side devices.

The game state distribution section 42 distributes information on a state of a game to a reception-side device while the user is playing the game. Specifically, according to this embodiment, the game state distribution section 42 distributes the game image for distribution generated by the game execution section 41 to the reception-side device. As described above, a game image for distribution may be the same as a game image for play or may be different from the game image for play. Moreover, a game image for distribution may be an image generated by the game state distribution section 42 processing a game image for play generated by the game execution section 41. For example, the game state distribution section 42 may generate a game image for distribution by superimposing, on a game image for play (or a game image generated by the game execution section 41 for distribution independently of the game image for play), information on the distribution of a game play state (such as the number of reception-side devices currently receiving the distribution).

Figure 4:
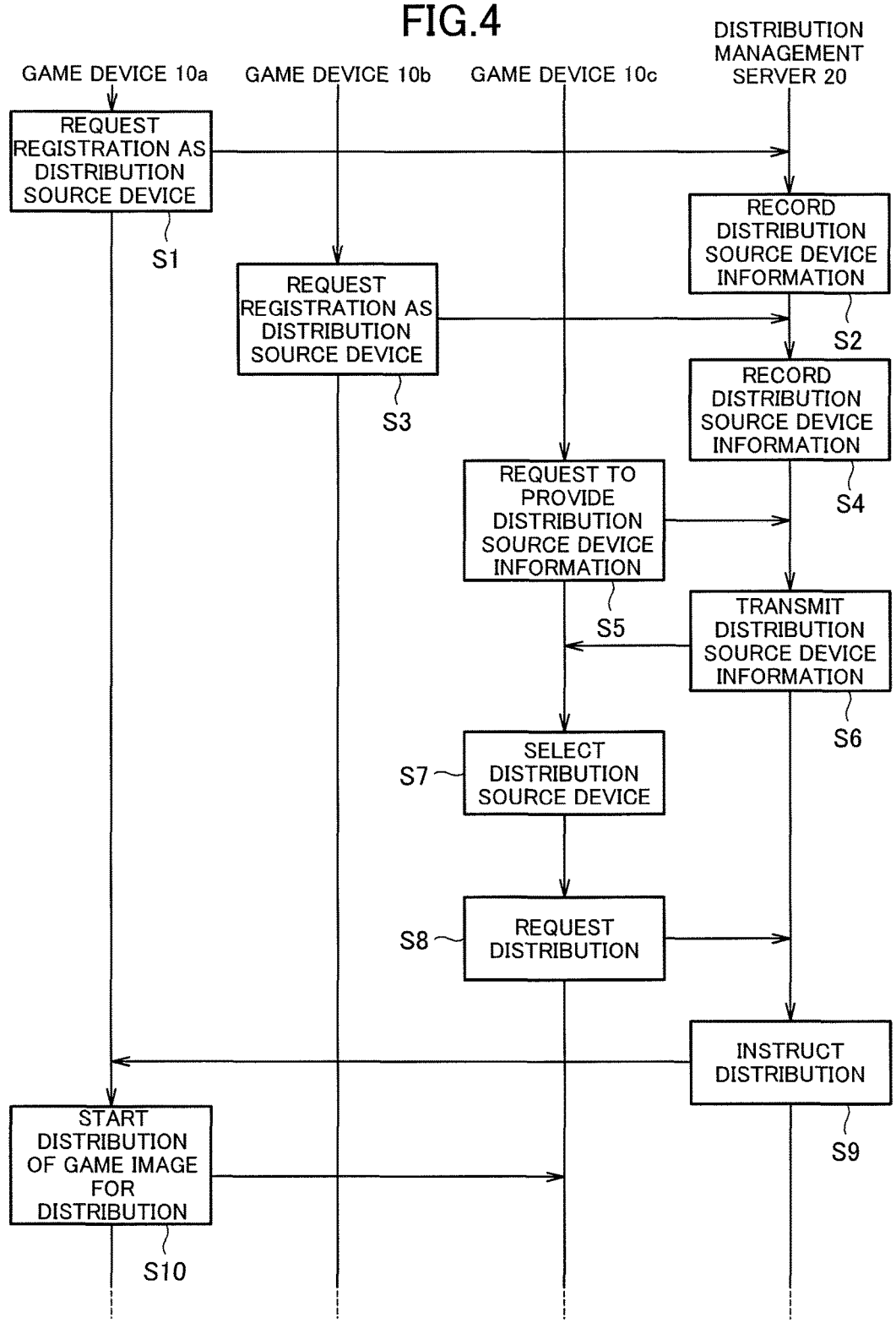
FIG. 4 A flowchart illustrating an example of a flow of processing when distribution starts.

On this occasion, the reception-side device, which is the distribution destination of the game play state by the game state distribution section 42, is determined by transmission and reception of information via the distribution management server 20. Referring to the flowchart of FIG. 4, a description is now given of a specific example of a flow of processing when the distribution starts. In this example, it is assumed that the game state distribution section 42 of the game device 10a first requests the distribution management server 20 to register the game device 10a as a distribution source device in response to an instruction by the user or the like during the game processing by the game execution section 41 (S1). The distribution management server 20 records information on the game device 10a which has made the request as distribution source device information (S2). Further, on this occasion, it is assumed that the game state distribution section 42 of the game device 10b similarly requests the registration as a distribution source device (S3), and the distribution management server 20 also records information on the game device 10b as the distribution source device information (S4). Then, when another game device 10 (on this occasion, the game device 10c) requests the distribution management server 20 to provide information on the distribution source device information (S5), the distribution management server 20 transmits, to the game device 10c which has made the request, the recorded distribution source device information (S6). The game device 10c can acquire information on game devices 10 which can currently distribute a game play state to another game device 10 by receiving the distribution source device information from the distribution management server 20, and can select a game device 10 from which the game device 10c actually receives distribution of a game play state. In this example, the game device 10c acquires, as a list of game devices 10 which are candidates as the distribution source device, the information on the game devices 10a and 10b from the distribution management server 20. Then, the game device 10c selects a distribution source device from which the game device 10c receives the distribution from the list by a method such as receiving a specification by the user (S7). In the example illustrated in FIG. 4, it is assumed that the game device 10c selects the game device 10a as the distribution source device. In this case, the game device 10c transmits a distribution request specifying the game device 10a to the distribution management server 20 (S8). The distribution management server 20 receives the distribution request, and instructs the game device 10a to distribute the game play state to the game device 10c (S9). In response to the instruction, the game state distribution section 42 of the game device 10a starts the distribution of a game image for distribution to the game device 10c (S10).

The game image display control section 43 controls the display unit 15 to display a game image generated by the game execution section 41, thereby presenting the game image to the user. Usually, the game image display control section 43 displays a game image for play while the user is playing a game. However, the game image display control section 43 may display, in response to an instruction by the user, a game image for distribution which is being distributed to a reception-side device. Moreover the game image display control section 43 may display a message subject to transmission/reception by the message transmission/reception section 48 as described later. A description is later given of a specific example of the display content by the game image display control section 43.

The game participation reception section 44 receives a request to participate in the game from the reception-side device while the game execution section 41 is carrying out the game processing and a game image for distribution representing a play state of the game is being distributed to a reception-side device. When the request of the game participation is accepted, subsequently, the game participation reception section 44 receives, from the reception-side device, information indicating a content of a game operation out by a user of the reception-side device. Then, the game participation reception section 44 outputs the received information on the game operation to the game execution section 41. As a result, the game execution section 41 can acquire a content of a game operation input by the user of the reception-side device on the operation unit 16 of the reception-side device to thereby carry out the game processing in the same manner as a game operation input by the user of the distribution source device on the operation unit 16 of the distribution source device. Therefore, the user of the reception-side device carries out the game operation as if the operation unit 16 operated by the user were directly connected to the distribution source device, thereby playing the game which is being executed on the distribution source device. A result of the game processing reflecting the content of the game operation carried out by the user on the reception-side device is distributed as a game image for distribution from the game state distribution section 42 of the distribution source device to the reception-side device.

The received motion image selection section 45 selects, from a plurality of motion images serving as candidates of distribution to be received by the game device 10 functioning as the reception-side device, a motion image to be actually received by the game device 10. According to this embodiment, each of the plurality of game devices 10, as a distribution source device, distributes a motion image representing a play state of a game, and hence the received motion image selection section 45 selects, from the plurality of game devices 10, a game device 10 which serves as the distribution source device for the game device 10 itself. Specifically, when the user instructs browsing of a game image distributed by another game device 10, the received motion image selection section 45 first transmits to the distribution management server 20 a request to provide the distribution source device information (above-mentioned processing S5 in the flowchart of FIG. 4). Further, the received motion image selection section 45 refers to the distribution source device information transmitted by the distribution management server 20 in response to the request for provision, and controls the display unit 15 to display the list of game devices 10 which can currently carry out the distribution to another game device 10. Then, the received motion image selection section 45 prompts the user to select one game device 10 as the distribution source device from the list. As a result, the received motion image selection section 45 selects the distribution source device which distributes a game image to the own device.

Moreover, the received motion image selection section 45 may select a game device serving as the distribution source device by means of a method other than the above-mentioned method which is based on the received selection by the user. A specific example of this selection method is described later.

The motion image reception section 46 receives information on a game image for distribution from the distribution source device, and controls the display unit 15 to display the game image for distribution, thereby presenting the game image for distribution to the user. As a result, the user can browse the state of the game being executed on another game device 10 as a motion image.

The game participation control section 47 makes a request for game participation to the distribution source device in response to an instruction by the user while the motion image reception section 46 is receiving a game image for distribution distributed by a distribution source device. When the request for game participation is accepted by the distribution source device, subsequently, the game participation control section 47 transmits a content of a game operation carried out by the user on the operation unit 16 to the distribution source device as described above. A description is later given of other control accompanying the game participation.

The message transmission/reception section 48 exchanges messages with other game devices 10. In other words, the message transmission/reception section 48 transmits a message constituted by a string input by the user to a game device 10 specified by the user in response to a request from the user. Moreover, the message transmission/reception section 48 receives a message transmitted by another game device to the own game device 10. In particular, according to this embodiment, the message transmission/reception section 48 of the reception-side device transmits a message input by the user of the reception-side device regarding the distributed game play state to the distribution source device while the game play state is being distributed. Moreover, the message may be transmitted to other reception-side devices which are receiving the game play state from the same distribution source device. Further, the message transmission/reception section 48 of the distribution source device receives a message transmitted from the message transmission/reception section 48 of the reception-side device, and transmits a content of a message input by the user of the distribution source device to the reception-side device which is receiving distribution from the distribution source device. As a result, the user of the distribution source device and the user of the reception-side device can exchange messages regarding the game play state being distributed, thereby communicating with each other. Specifically, by the message exchange, for example, the user of the reception-side device can provide a user playing a game with a hint on the game, and can make a comment on or broadcast a play content to other users watching the play state of the same game. The message transmitted by the message transmission/reception section 48 to users of other game devices 10 may be directly transmitted to the destination game devices 10, or may be transmitted to the destination game devices 10 via the distribution management server 20 or other message relay servers.

Note that, the user of the reception-side device not only transmits a message constituted by a string relating to a received game image for distribution, but also may carry out feedback to the user of the distribution source device by carrying out a predetermined operation on the operation unit 16. For example, the user of the reception-side device operates a specific button in a scene in which the user is interested while the user is watching a game image for distribution. Then, the reception-side device notifies the distribution source device of the carried-out button operation, and the game image display control section 43 of the distribution source device controls the display unit 15 to display an image notifying of the carried-out button operation (such as a predetermined icon image) along with a game image for play. As a result, even when the user of the reception-side device does not bother to input a string, the user of the distribution source device can know a reaction of the user of the reception-side device to the game image which the user of the distribution source device is distributing.

[Displayed Contents on Distribution Source Device]

A description is now given of a specific example of the display method of the game state and messages on the distribution source device. As described above, the game device 10 has the function of receiving a message from another game device 10. The game device 10 may display the received message on a dedicated display screen, thereby presenting the received message to the user. However, when a message relating to a game play state which is being distributed is displayed on the dedicated display screen, a relationship between the message and the game play state is hard to understand. Thus, according to this embodiment, the game image display control section 43 may control the display unit 15 to display a game image representing a state of a game being executed by the game execution section 41 along with a message received by the message transmission/reception section 48 from the reception-side device. As a result, while the user is browsing the state of the game, the user can simultaneously browse a message input by another user regarding the state of the game. Moreover, the game image display control section 43 may display messages transmitted by this game device 10 to another game device 10 along with the game image and the received messages.

Figures 5, 6:
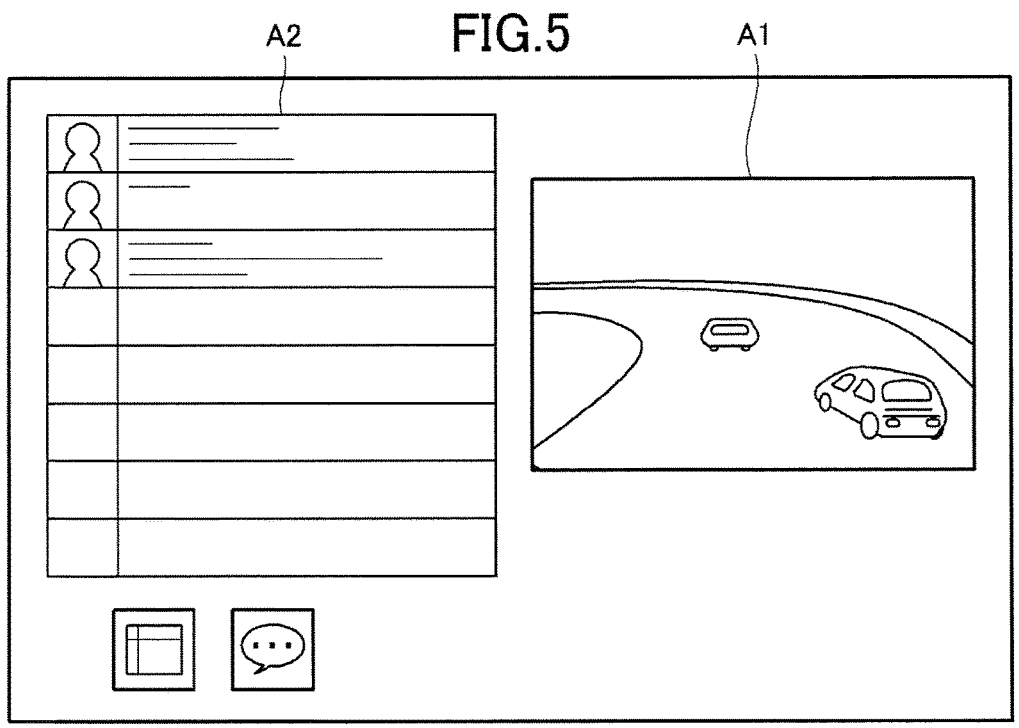
FIG. 5 A view illustrating an example of a display image displayed by a distribution source device.
FIG. 6 A view illustrating an example of distribution source device information managed by a distribution management server.

FIG. 5 is a view illustrating an example of an image which the game image display control section 43 controls the display unit 15 to display on the distribution source device. In the example illustrated in FIG. 5, a game image is displayed in an area A1 on the right side when facing the screen. Moreover, a plurality of messages received and transmitted by the game device 10 are displayed in a row in an area A2 on the left side when facing the screen. On this occasion, the game image displayed along with the messages by the game image display control section 43 may be a game image for play generated by the game execution section 41.

The display control for the image in this way is realized by the following processing. Specifically, the game execution section 41 writes a frame image constituting the game image for play at a predetermined time interval not directly in a frame buffer memory of the image processing section 14, but in a memory area for drawing which is reserved in the storage unit 12. The game image display control section 43 reads the frame image written in the memory area, reduces the size of the frame image, and combines the frame image with an image representing a content of messages, thereby generating an image to be displayed by the display unit 15. Then, the game image display control section 43 writes the generated image in the frame buffer memory. By repeating this processing every predetermined period which is determined depending on an update frequency (frame rate) of the image displayed on the display unit 15, the game image display control section 43 can display the game image for play as a motion image, and can display messages which are transmitted and received relating to the game image.

Moreover, when the game execution section 41 generates a game image for distribution independently of a game image for play, the game image display control section 43 may control the display unit 15 to display the game image for distribution along with the messages. This configuration enables the user to browse, while checking as what image a content of the game played by the user is distributed to other users, messages uttered by other users who have watched the distributed image of the game. In this case, the game execution section 41 also writes a frame image constituting the game image for distribution at an interval of a predetermined period in the predetermined memory area of the storage unit 12. The frame images written at the interval of the predetermined period are sequentially read by the game state distribution section 42, are coded into streaming data of a motion image, and are distributed to the reception-side devices. On this occasion, in order to reduce the amount of transferred data, the game state distribution section 42 may reduce the size of the frame image and then may code the frame image reduced in size. On the other hand, the game image display control section 43 reads the written frame image each time a new frame image is written in the memory area in the storage unit 12. Then, the game image display control section 43 combines an image which is obtained by reducing the read frame image in size and an image representing contents of messages with each other, thereby generating an image to be displayed by the display unit 15, and writes the generated image in the frame buffer memory. As a result of this processing being repeated, the game image for distribution is displayed as a motion image on the display unit 15, and the contents of the messages input by the users of the reception-side devices who have browsed the game image for distribution are also displayed.

Moreover, images which the game image display control section 43 controls the display unit 15 to display include information on a state of the game currently distributed by the game device 10 in addition to the transmitted and received messages and the game image. Specifically, for example, the game image display control section 43 may include information on the number of the reception-side devices which are currently receiving a motion image distributed by the game device 10 in a display image, and may present the display image to the user. This configuration enables the user of the distribution source device to easily recognize the number of the other users who are browsing the play state of the user of the distribution source device.

Note that, a type of the image which the game image display control section 43 controls the display unit 15 to display may be switched depending on an instruction by the user. Usually, in order for the user to concentrate on the play of a game, only a game image for play is preferably displayed on the entire display unit 15. When the user instructs the switch of the display by an operation input on the operation unit 16 in a state in which the game image for play is solely displayed, the game image display control section 43 controls the display unit 15 to display an image including transmitted and received messages and a game image as illustrated in FIG. 5. Then, when the game image display control section 43 further receives an instruction to switch the display in that state, the display unit 15 returns again to the state in which the only the game image for play is displayed. This configuration enables the user, depending on the state, to solely display the game image for play, thereby concentrating on the play of the game, or to browse messages simultaneously while browsing the game image for play or a game image for distribution.

[Selection of Motion Image by Reception-Side Device]

As described above, the reception-side device receives the distribution source device information from the distribution management server 20, and selects a motion image to be received by the reception-side device itself by selecting a distribution source device from a list of the game devices 10 represented by the received information. In this case, the reception-side device may select the distribution source device by using attribute information associated with the motion image subject to the distribution. A description is now given of a specific example of this case.

The distribution management server 20 receives, as the distribution source device information, attribute information associated with a game image for distribution distributed by the distribution source device from the distribution source device in addition to information (such as a host name) for identifying the distribution source device itself, and stores the attribute information. The attribute information includes user identification information (such as a name of the user) for identifying the user (namely, the user of the distribution source device playing the game represented by the distributed motion image) who has instructed the distribution of the motion image, game identification information (such as a game title) for identifying the game subject to the distribution, and maker information (such as a name of the maker) for identifying a company providing the game (maker). As an example, the distribution management server 20 holds a table illustrated in FIG. 6 as the distribution source device information. The distribution source device information is list information indicating which game device 10 is currently distributing a motion image having which attribute. The game images for distribution distributed by the respective game devices 10 included in the list serve as candidates for the motion image subject to the display on the reception-side device.

In this example, the received motion image selection section 45 of a game device 10 which is to receive distribution of a motion image from another game device 10 as a reception-side device first acquires selection condition information. On this occasion, the selection condition information is information for specifying conditions for selecting a motion image subject to display on the reception-side device, and corresponds to any one of or a plurality of the above-mentioned attribute information items. Specifically, the selection condition information may be information for specifying any one of the plurality of user identification information items. Moreover, the selection condition information may be information for specifying any one of the game identification information and the maker identification information. A specific example of an acquisition method for the selection condition information is described later.

Then, the received motion image selection section 45 acquires the distribution source device information from the distribution management server 20, and narrows down distribution source devices associated with attribute information corresponding to the selection condition information from the distribution source device information. When the number of the narrowed-down distribution source devices is only one, the received motion image selection section 45 selects a motion image distributed by the narrowed-down distribution source device as the display subject. Alternatively, when the distribution source devices are narrowed down to a plurality of distribution source devices, the received motion image selection section 45 selects one distribution source device out of the plurality of narrowed-down distribution source devices based on predetermined conditions. The predetermined conditions on this occasion may include, for example, a condition of randomly selecting a distribution source device, a condition of selecting a distribution source device which distributes a motion image watched by the largest number of users (in other words, received by the largest number of reception-side devices), or a condition of selecting a distribution source device having the distribution source device information most recently registered to the distribution management server 20. Alternatively, the received motion image selection section 45 may control the display unit 15 to display information on motion images being distributed by the plurality of narrowed-down distribution source devices, and may prompt the user to select a motion image subject to display out of the narrowed-down motion images.

A description is now given of specific examples of the acquisition method for the selection condition information.

As a first example, when the received motion image selection section 45 of the game device 10 receives a message from another game device 10, the received motion image selection section 45 acquires the user identification information for identifying a user who has transmitted the message as the selection condition information. On this occasion, the message transmission/reception section 48 of the game device 10 may have a function of arbitrarily transmitting a message to a user of another game device 10 irrespective of whether or not the game device 10 is distributing or receiving a game image for distribution. Moreover, each game device 10 may have a function of registering a user of another game device 10 as a friend of the user of the game device 10. Particularly, the setting regarding the friend may be carried out when users mutually permit to become friends. Specifically, for example, when a user U1 of the game device 10a wants to set a user U2 of the game device 10b as a friend, the user U1 transmits a message asking for friend registration to the user U2. When the user U2 who has received the message accepts the proposal of the friend registration in response to the message, the friend setting between the user U1 and the user U2 is carried out. In this example, the message transmission/reception section 48 of the game device 10a embeds user identification information for identifying the user U1 into the message for proposing the friend registration to be transmitted to the game device 10b. When receiving the message for proposing the friend registration from the user U1, the received motion image selection section 45 of the game device 10b acquires the user identification information on the user U1 included in the received message as the selection condition information in response to an instruction by the user U2. As a result, the received motion image selection section 45 selects, as a motion image subject to display, a motion image representing a state of a game being played by the user who has proposed the friend registration. The user U2 can watch how the user U1 who has proposed the friend registration is playing the game by receiving the motion image, and determines whether or not to accept the proposal of the friend registration from the user U1.

As a second example, the game device 10 may acquire information on a game being executed by the game execution section 41 as the selection condition information. Specifically, the received motion image selection section 45 acquires information on a game being executed by the game execution section 41 (for example, information for identifying the game itself or information for identifying a maker of the game) as the selection condition information in response to an instruction from the game execution section 41, and selects a motion image to be received by using the acquired selection condition information. Then, the motion image reception section 46 starts reception of the selected motion image, and controls the display unit 15 to display a content thereof. As a result, while the game execution section 41 is executing a game, a motion image distributed by another game device 10 relating to the game can be presented to the user.

As a more specific example, the game execution section 41 instructs the start of selection and reception of a motion image at a timing when the game application starts predetermined processing (for example, processing of reading data from information storage medium such as an optical disc). Usually, the processing of reading data from an information storage medium such as an optical disc takes a time, and the user needs to wait until the processing is finished. Therefore, acquiring and displaying a motion image relating to the game being carried out from another game device 10 while the processing of reading data is being carried out can prevent the user from getting tired. When the predetermine processing is finished, the game execution section 41 instructs the motion image reception section 46 to finish the reception and display of the motion image, and resumes the display of the image (game image for play) generated by the game application.

Further, in this example, the received motion image selection section 45 may select a motion image of a game which is provided by a maker of a game being executed, and is other than the game being executed by using the game identification information for identifying the game being executed and the maker identification information for identifying the maker of the game. The selection of the motion image in this way enables to present, to the user, a motion image of a game other than the game being executed by the user, and can provide an opportunity for the user to purchase a new game. In this case, the received motion image selection section 45 may select, as the motion image subject to display, a motion image of a game having the largest number of motion images being distributed out of games from the same maker other than the game being executed.

Moreover, when the game execution section 41 of the reception-side device selects, as the motion image subject to display, a motion image of a game which the game execution section 41 of the reception-side device has previously executed (namely, a game of a program which the user of the reception-side device owns), the received motion image selection section 45 may select the motion image subject to display depending on a degree of progress of the game when the user has played the game. As a specific example, display of a motion image representing a play state at a degree of progress higher than a degree of progress of the play by the user at the current time point may not be preferred depending on the type of the game. Specifically, in a roll playing game or an adventure game, when a motion image representing a play state at a degree of progress higher than a degree of progress of the play by the user is displayed, the user may know a content of a story of the game which the user is going to play. Moreover, it is considered that a motion image representing a play state at a degree of progress relatively close to a degree of progress of the play of the user is a motion image which the user is interested in. Then, considering this fact, the reception-side device may use degree-of-progress information indicating a degree of progress of the game (for example, numerical information indicating a level of a game character or a degree of progress, or tag information indicating a progress stage of a story) as the selection condition information, thereby selecting a motion image subject to display.

In this case, the game device 10, which is going to carry out the distribution, notifies the distribution management server 20 of the degree-of-progress information indicating a degree of progress of a game currently being played as the attribute information. Moreover, the reception-side device acquires the degree-of-progress information indicating a degree of progress of the game as the selection condition information for each of games which have been previously executed by the game execution section 41. The degree-of-progress information can be acquired by referring to, for example, history information output by a game application as a game previously executed by the game execution section 41 progresses, or information (such as so-called save data) for reproducing a state in the course of the play of a game. Then, the received motion image selection section 45 selects, as the motion image subject to display, a motion image representing a play content at a degree of progress determined depending on a degree of progress represented by the acquired degree-of-progress information for each of the games for which the degree-of-progress information is acquired. More specifically, for example, the received motion image selection section 45 of the reception-side device excludes a motion image with which information indicating a degree of progress higher than a degree of progress represented by the acquired degree-of-progress information as the selection condition information is associated as the attribute information from subjects to selection. As a result, when a motion image of a game which the user is playing is displayed, a motion image of the same game representing a state of play at a degree of progress exceeding a degree of progress of the game of the user can be prevented from being displayed. Alternatively, the received motion image selection section 45 selects a motion image with which information indicating a degree of progress the same as or close to a degree of progress represented by degree-of-progress information acquired as the selection condition information is associated as the attribute information. Moreover, the received motion image selection section 45 may select a motion image by combining those conditions. In other words, a motion image which has a degree of progress equal to or lower than a degree of progress represented by degree-of-progress information acquired as the selection condition information, and with which degree-of-progress information indicating a degree of progress closest to the degree of progress represented by the acquired degree-of-progress information is associated becomes subject to the selection. In this way, a motion image representing a play state at a degree of progress matching the degree of progress of the game of the user of the reception-side device can be presented to the user.

Note that, types of the attribute information associated with a motion image serving as a distribution candidate or the information acquired as the selection condition information are not limited to the types described above. For example, the received motion image selection section 45 may acquire, as the selection condition information, information for identifying users which have been registered as friends, and may select motion images distributed by those uses as motion images subject to display.

Moreover, in the above description, the received motion image selection section 45 acquires entire distribution source device information stored by the distribution management server 20 from the distribution management server 20, and selects a motion image subject to display out of candidate motion images represented by the distribution source information. However, candidate motion images may be narrowed down to a motion image subject to display on the distribution management server 20. For example, the received motion image selection section 45 of the game device 10 acquires the selection condition information, and then transmits a selection request including the acquired selection condition information to the distribution management server 20. The distribution management server 20, which has received the selection condition information, selects one of motion images with which attribute information corresponding to a selection condition included in the received selection request is associated, as a motion image subject to display on the game device 10 which has transmitted the selection request, by carrying out the same processing as the processing carried out by the received motion image selection section 45 in the above description. Then, the distribution management server 20 instructs a distribution source device which distributes the selected motion image to carry out the distribution to the game device 10 which has made the selection request. The distribution source device, which has received the instruction, carries out the distribution to the game device 10 which has made the selection request, and the game device 10, as the reception-side device, thus receives and displays the motion image selected by the distribution management server 20. Note that, the distribution management server 20 may not narrow down motion images to one motion image subject to display on the game device 10 which has made the selection request. In this case, for example, the distribution management server 20 transmits respective pieces of information on a plurality of candidate motion images with which attribute information corresponding to selection condition information received from the game device 10 is associated to the game device 10. The game device 10, which has received the information, narrows down the motion images to one motion image to be finally displayed by the display unit 15 by a method such as providing a user with a chance of selection, and requests the distribution management server 20 to distribute the motion image from a distribution source device.

Moreover, in the above description, a motion image representing a state of game being currently executed by another game device 10 is set as a motion image of a distribution candidate, but a motion image selected by the above-mentioned selection method as a distribution candidate is not limited to this type of motion image. For example, each of the game devices 10 may transmit data on a motion image, which is subject to distribution to other game devices 10, to the distribution management server 20, and the distribution management server 20 may store the received data on the motion image. In this case, even after the play of the game (and distribution of a motion image representing the play state) is finished on a distribution source device, data on the distributed motion image is accumulated in the distribution management server 20. The distribution management server 20 associates attribute information received from game devices 10 which have finished the distribution of motion images with the motion images, and stores the attribute information. This configuration enables the distribution management server 20 to serve as a distribution source device by itself, and can distribute a motion image, which has previously distributed from any one of the game devices 10 to another game device 10, to a game device 10 which has made a distribution request. Even in this case, by narrowing down motion images subject to display depending on selection condition information acquired by the game device 10 which is to receive the distribution, a motion image subject to display can be efficiently selected. Note that, a motion image distributed by the distribution management server 20 may not be a motion image itself distributed by a distribution source device to a reception-side device, but a motion image generated by a user of the distribution source device editing the motion image. Moreover, a distribution source device may not upload, to the distribution management server 20, a motion image previously distributed by itself, or a motion image acquired by editing the motion image, but may store the motion image by itself, and may distribute the motion image to another game device 10 in response to a request.

[Game Participation]

A description is now given of control for case where a user of a reception-side device participates in a game being executed on a distribution source device. When the game being executed on the distribution source device is a game in which a plurality of users can participate, as described above, the reception-side device can participate in the game by transmitting a participation request to the distribution source device. In this case, when receiving a predetermined operation input on the operation unit 16 from the user in a state in which the motion image reception section 36 controls the display unit 15 to display a game image for distribution received from the distribution source device, the game participation control section 47 of the reception-side device transmits a participation request for a game to the distribution source device in response to the reception of the operation input. The predetermined operation input in this case may be an operation of a specific operation member constituting the operation unit 16, for example. Alternatively, the predetermined operation may be an operation on an operation subject image, which is subject to a participation operation, displayed on the screen of the display unit 15. Specifically, for example, the motion image reception section 46 displays an icon image representing a participation button, as an operation subject image, along with a game image for distribution received from the distribution source device. Then, when the user focuses on the participation button by operating the operation unit 16, thereby instructing a direction, and carries out an operation to instruct determination, a participation request for the game is transmitted to the distribution source device. As a result, the user of the reception-side device can carry out the participation procedure for the game at a proper timing (a timing which does not interrupt the play of the game such as a timing when the user of the distribution source device temporarily suspends the play of the game) while browsing a play state of the game.

Figure 7:
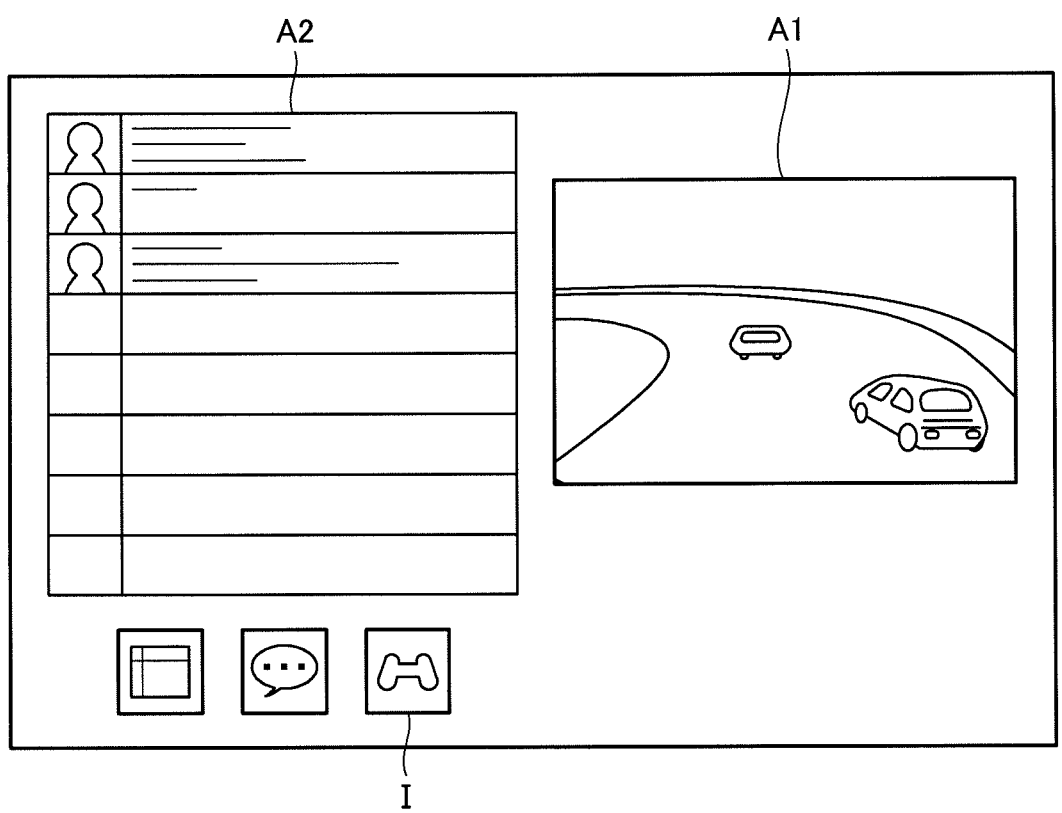
FIG. 7 A view illustrating an example of a display image displayed by a reception-side device.

FIG. 7 is a view illustrating an example of a display screen including an icon image I representing such a participation button. As the example of this figure illustrates, the reception-side device may display, similarly to the distribution source device, a game image for distribution distributed from the distribution source device on the area A1, and display messages transmitted to and received from the distribution source device in the area A2.

Moreover, the game participation control section 47 may transmit the participation request for a game being executed on a distribution source device not directly to the distribution source device, but to the distribution management server 20. In this case, the distribution management server 20 determines whether or not to accept the participation in the game of the reception-side device which has made the participation request based on predetermined conditions, and, when the participation is accepted, transfers the participation request to the distribution source device. In this case, the reception-side device has requested the distribution management server 20 to distribute a motion image from the distribution source device before making the participation request for the game, and the distribution management server 20 can identify the distribution source device, which is currently distributing the motion image to the reception-side device, as the game device 10 subject to the participation request even when the reception-side device does not particularly specify the game device 10 subject to participation. In this way, the participation request is processed via the distribution management server 20, and the distribution management server 20 can restrict participation of each of game devices 10 in a game being executed on another game device 10.

For example, it may not be preferred, depending on the type of game, that a user who does not own a program of a game subject to the participation request can play the game being executed on another game device 10 without restriction by the control for the game participation according to this embodiment. Therefore, the distribution management server 20 may store information for identifying games subject to the participation restriction in advance, and, when the distribution management server 20 receives a participation request for a game specified by the information, may determine whether or not to accept the game participation based on predetermined conditions.

An example of the condition for determining whether or not to accept the participation may include a condition that the game execution section 41 of a reception-side device which has made a participation request has previously executed the game subject to the participation request (namely, a user of the reception-side device can play the game on the own game device 10). Specifically, the distribution management server 20 which has received a participation request for a game subject to restriction inquires the game device 10, which has made the participation request, of whether or not the application of the game has previously been executed. As a result, when the distribution management server 20 determines that the application has previously been executed, it is estimated that the user who has made the participation request can play the game subject to the participation request on the own game device 10 (reception-side device), and the distribution management server 20 unconditionally accepts the participation. On the other hand, when the game subject to the participation request has not been executed on the reception-side device, the distribution management server 20 restricts the participation in the game in a predetermined manner. The manner of the restriction on this occasion may include, for example, absolute prohibition of the participation, and permission only for a certain period. Moreover, the manner of restriction may be set individually for game applications. For example, regarding a game G1, a user who does not own a program of the game may be permitted to participate in the game on another game device 10 for one hour per day, and, regarding a game G2, the user may be permitted to participate in the game for three hours per day.

In this case, the distribution management server 20 may determine whether or not a game subject to a participation request has previously been executed on the reception-side device, for example, by referring to history information recoded when the game execution section 41 executes a game application. Alternatively, the distribution management server 20 may make the determination based on whether or not information (information on save data) for reproducing a state in the course of play of a game recorded by an instruction of a user playing the game on the information storage medium is present.

Moreover, in the above description, the distribution management server 20 determines whether or not to accept the game participation, but the reception-side device or the distribution source device may determine whether or not to accept the game participation.

Further, a description is now given of processing after the game participation. As described above, a game application executed by the game application section 41 according to this embodiment can generate, in addition to a game image for play displayed on the display unit 15 connected to the distribution source device, a game image for distribution displayed on the display unit 15 connected to the reception-side device. Therefore, a user of the reception-side device who has participated in a game being executed on the distribution source device can not only play the game while sharing the same game screen as that of the distribution source device but also independently play the game while browsing the game image different from the game image for play of the distribution source device. Specifically, for example, in an adventure game, a plurality of users select options different from one another in the course of the game, and continue the play of the game, and the respective users of the distribution source device and the reception-side devices can enjoy in real time changes in the progress of the game generated by the selection of the options.

Moreover, according to this embodiment, a game application executed by the game execution section 41 may output information on a play result of a game (hereinafter, referred to as play-result-related information). The play-result-related information is information output by the game application when a play result of a game by a user satisfies predetermined conditions, and may include, for example, a point representing a degree of achievement of the game play by a user, information on a rank representing how good the play result of the game is, and information indicating achieved plays satisfying special conditions. In this case, the game execution section 41 of the distribution source device 41 may output the play-result-related information not only on play by the user of the distribution source device but also on play by the user of the reception-side device, may associate the play-result-related information on play by the user of the reception-side device with the user of the distribution source device, and may store the play-result-related information in the storage unit 12 of the distribution source device. As a result, the user of the distribution source device can acquire not only the play-result-related information reflecting the own game play, but also the play-result-related information reflecting the game play by the user of the reception-side device as an own play result.

Moreover, the reception-side device may be configured to acquire the play-result-related information output by the game execution section 41 of the distribution source device. In this case, when a play carried out by the user of the reception-side device satisfies predetermined conditions, and the game execution section 41 of the distribution source device outputs the play-result-related information, the game participation reception section 44 transmits the play-result-related information to the reception-side device. The game participation control section 47 of the reception-side device, which has received the play-result-related information, determines whether or not the game the user has participated in has also previously been executed on the reception-side device. As a result, when the game participation control section 47 determines that the game which the user has participated in has also previously been executed on the reception-side device, the game participation control section 47 associates the play-result-related information received from the distribution source device with the user of the reception-side device, and stores, in the storage unit 12, the play-result-related information along with play-result-related information previously output depending on the play results of the game by the reception-side device. In other words, the reception-side device treats the play-result-related information acquired as a result of the user playing a game on the reception-side device and the play-result-related information acquired as a result of participation in the game on the distribution source device as the same type of data, and stores and manages the information in a common storage area. Moreover, when the play result-related-information is numerical information such as a point representing a degree of achievement, the reception-side device may sum both pieces of information, and may store the accumulated value as new play-result-related information.

Conversely, when the game which the user has participated in is a game which has not previously been executed on the reception-side device, the game participation control section 47 of the reception-side device may discard the received play-result-related information, or instead of discarding, may store the received play-result-related information in the storage unit 12 as temporarily stored data. In the case where the play-result-related information is stored as the temporarily stored data, when the game execution section 41 later executes the application of the game and outputs play-result-related information on a game play result of the user, the game participation control section 47 stores the play-result-related information stored as the temporarily stored data, as information indicating the play result of the user of the reception-side device, along with play-result-related information output by the game execution section 41. In this way, the user of the reception-side device can, also for a game the user does not own, participate in the game on another game device 10, acquire play-result-related information, and, reflect the play-result-related information acquired in advance as an own game play result when the user later purchases the game and starts the play of the game on the own game device 10.

Moreover, when the user of the reception-side device participates in a game being executed on the distribution source device and suspends the play in the course thereof, the reception-side device may receive information such as save data for reproducing a state in the course of the play from the distribution source device, and store the information. As a result, when the user on the reception-side device owns a program of the game in which the user has participated, the user can play a continuing part of the game played on another game device on the own game device 10.

The invention claimed is:

1. A game device having a processor comprising:
a selection unit for receiving, from a user of the game device, selection information for selecting a motion image from a plurality of candidate motion images displayed on a display unit of the game device,
wherein the plurality of candidate motion images are received from a distribution source, and
wherein each candidate motion image represents the content of play of the a game by another user of another game device,
a display control unit that receives, using the processor, the selected motion image from the another game device and controls the display unit to display the received selected motion image;
wherein the another game device that distributed the selected motion image displayed on the display unit of the game device comprises:
a game execution unit for executing a game application;
a distribution unit for distributing information on a state of the game being executed to the distribution source;
wherein:
the game execution unit generates a game image for play to be displayed on a display of the another game device,
after the user of the game device selects the selected motion image, generates a game image for distribution different from the game image for play,
wherein the game image for distribution is used for distribution by the distribution unit,
wherein the game execution unit can selectively switch between viewing the game image for distribution and the game image for play for viewing on a display of the game execution unit;
and
wherein the distribution unit distributes, to the game device, the game image for distribution.

2. The game device according to claim 1, further comprising a message reception unit that receives a message including information for identifying the another game device.

3. The game device according to claim 1, further comprising a message transmission unit that transmits a message, which is input by a user of the game device regarding the distributed information, to the another game device,
wherein the display control unit controls the display unit to display the game image representing the state of the game along with both the received message and the transmitted message.

4. The game device according to claim 1, wherein:
the distribution source device distributes the information on the state of the game to a plurality of other game devices.

5. The game device according to claim 1, wherein:
the motion image is a motion image representing the content of current play of the game that is being executed by the another user; and
the game device further comprises:
an operation reception unit that receives a predetermined operation input from a user in a state in which the motion image is displayed; and
a participation request unit that transmits a participation request in the current play of the game that is being executed by the another user to the distribution source device in response to the reception of the predetermined operation input, and, upon acceptance of the participation request, the distribution unit distributes the game image for play instead of the game image for distribution to the game device.

6. The game device according to claim 5, wherein:

the display control unit provides control of displaying an operation subject image subject to a participation operation along with the motion image; and the operation reception unit receives an operation by the user on the operation subject image as the predetermined operation input.

7. The game device according to claim 5, further comprising a game execution unit that executes a game application, wherein when the game subject to the participation request has not previously been executed by the game device, participation in the game in response to the participation request is restricted based on a predetermined condition.

8. The game device according to claim 5, further comprising:

a game execution unit that executes a game application;

a play-result-related information reception unit that receives, from the another game device, play-result-related information relating to a play result of the game in which the user has participated in response to the participation request; and a play-result-related information storage unit that stores the received play-result-related information in association with the user along with information output as a result of execution, by the game execution unit, of an application of the same game as the game in which the user has participated.

9. The game device according to claim 5, wherein the game execution unit generates a second game image for distribution different than the game image for distribution, and wherein the second game image for distribution is transmitted to a second game device.

* * * * *